United States Patent
Trika et al.

(10) Patent No.: US 6,697,080 B2
(45) Date of Patent: Feb. 24, 2004

(54) SCALABLE SMOOTHING OF GENERALIZED POLYGONS

(75) Inventors: Sanjeev Trika, Hillsboro, OR (US); Michael Rosenzweig, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 83 days.

(21) Appl. No.: 09/350,416

(22) Filed: Jul. 8, 1999

(65) Prior Publication Data

US 2002/0051004 A1 May 2, 2002

(51) Int. Cl.[7] .................... G09G 5/00; G06T 11/20
(52) U.S. Cl. .................. 345/619; 345/611; 345/441
(58) Field of Search ................. 345/441, 442, 345/433, 431, 467–469, 144, 619, 471, 443, 611, 469.1; 382/266, 256, 275, 269, 264

(56) References Cited

U.S. PATENT DOCUMENTS

| | | | | |
|---|---|---|---|---|
| 4,949,281 A | * | 8/1990 | Hillenbrand et al. | 345/442 |
| 5,068,802 A | * | 11/1991 | Miyashita et al. | 345/619 |
| 5,333,248 A | * | 7/1994 | Christensen | 345/442 |
| 5,341,467 A | * | 8/1994 | Klassen | 345/442 |
| 5,469,189 A | * | 11/1995 | Noguchi et al. | 345/433 |
| 5,583,978 A | * | 12/1996 | Collins et al. | 345/170 |
| 5,594,852 A | * | 1/1997 | Tankelevich | 345/441 |
| 6,014,148 A | * | 1/2000 | Tankelevich | 345/442 |
| 6,100,893 A | * | 8/2000 | Ensz et al. | 345/441 |
| 6,133,921 A | * | 10/2000 | Turkiyyah | 345/420 |
| 6,157,750 A | * | 12/2000 | Choi et al. | 345/468 |
| 6,185,326 B1 | * | 2/2001 | Ikenoue | 382/266 |
| 6,246,805 B1 | * | 6/2001 | Sanjeev et al. | 345/471 |
| 6,304,677 B1 | * | 10/2001 | Schuster | 345/611 X |
| 6,338,000 B1 | * | 1/2002 | Nakajima | 345/964 |
| 6,483,509 B1 | * | 11/2002 | Rabenhorst | 345/442 |

* cited by examiner

Primary Examiner—Matthew Luu
Assistant Examiner—Chanté Harrison
(74) Attorney, Agent, or Firm—Sharmini N. Green

(57) ABSTRACT

A method and apparatus of smoothing a generalized polygon is disclosed. The method and apparatus identifies a vertex of the generalized polygon with a sharp corner and replaces the sharp corner with a rounding arc. In one embodiment, the method and apparatus draws a circle using said identified vertex as a center of said circle. The embodiment further identifies appropriate intersection points between said circle and said generalized polygon. With said intersection points identified, the embodiment ten formulates line segments between said intersection points and said vertex, and proceeds to replace said sharp corner between said intersection points with said rounding arc. Said rounding arc has said intersection points as its end points and has said formulated line segments as its tangents.

56 Claims, 9 Drawing Sheets

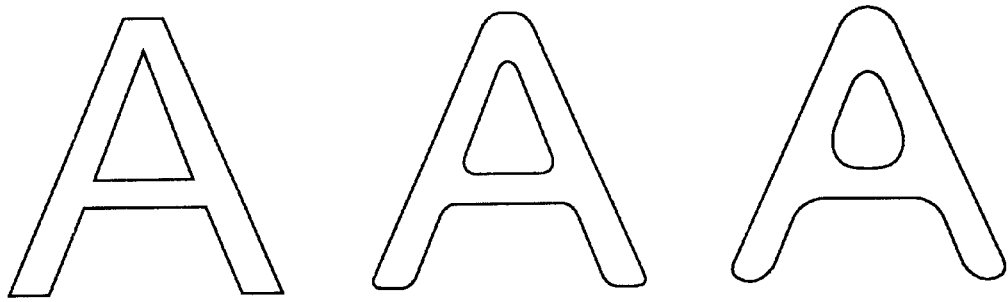
FIG. 6A   FIG. 6B   FIG. 6C

SCALABLE SMOOTHING OF GENERALIZED POLYGONS

FIELD OF THE INVENTION

This invention relates to image processing technologies generally and particularly to electronic systems capable of smoothing a generalized polygon.

BACKGROUND OF THE INVENTION

As digital image processing technologies continue to advance rapidly, in addition to the fidelity of image data, viewers of such image data also begin to place emphasis on the visual appeal of the image.

More specifically, typical considerations in image representation are the accuracy of image data, intelligibility criteria for measuring the quality of the image and the performance of a processing technique. Various techniques have been developed to address each of the mentioned areas. Some examples of the techniques are the uses of Fourier transforms, sampling and quantization techniques, filtering algorithms and enhancement algorithms.

However, even when an image is accurately represented, certain image features may still remain undesirable. For instance, rough or sharp edges may be subjectively unappealing to some viewers. In order to further improve an image's visual appeal to such viewers, a method and apparatus is needed to modify the image's ill-favored features.

SUMMARY OF THE INVENTION

A method and apparatus of smoothing a generalized polygon is disclosed. In one embodiment, a method of smoothing a generalized polygon identifies a vertex of the generalized polygon with a sharp corner and replaces the sharp corner with a rounding arc.

In another embodiment, a circle is drawn using the identified vertex as a center of the circle. The embodiment further identifies appropriate intersection points between the circle and the generalized polygon. With the intersection points identified, the embodiment then formulates line segments between the intersection points and the vertex, and proceeds to replace the sharp corner between the intersection points with the rounding arc. The rounding arc has the intersection points as its end points and has the formulated lines as its tangents.

BRIEF DESCRIPTION OF THE DRAWINGS

The present invention is illustrated by way of example and is not limited by the figures of the accompanying drawings, in which like references indicate similar elements, and in which:

FIGS. 6(a), 6(b), and 6(c) illustrate the effects of modifying a user rounding factor input.

DETAILED DESCRIPTION

A method and apparatus of smoothing a generalized polygon is described. In the following description, numerous specific details are set forth such as dot products, algorithms for identifying intersection points between a circle and a polygon, etc. in order to provide a thorough understanding of the present invention. However, it will be apparent to one of ordinary skill in the art that the invention may be practiced without these particular details. In other instances, well-known elements and theories, such as edge detection, image processing, trigonometry, generalized polygons, vectors, etc., have not been discussed in special details in order to avoid unnecessarily obscuring the present invention.

Figure 4:
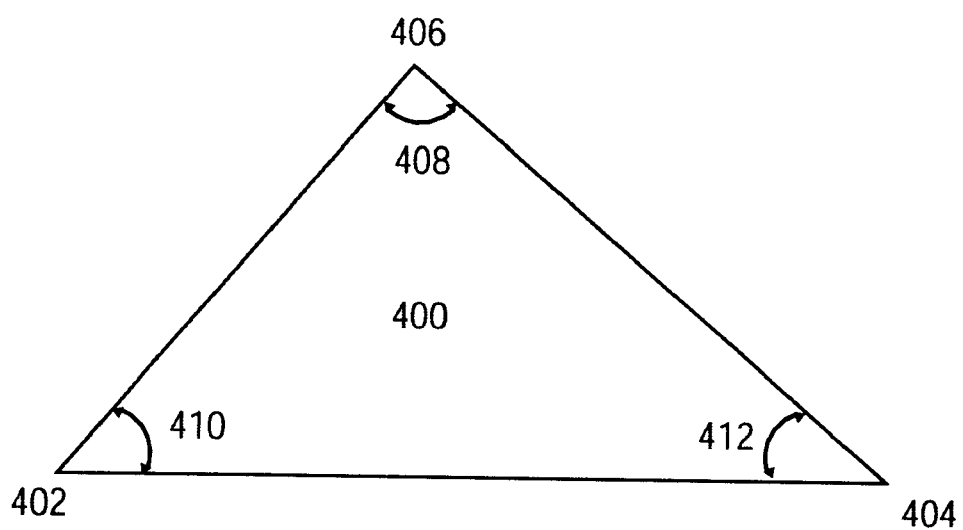
FIG. 4 illustrates an example of a generalized polygon.
Figure 5A:
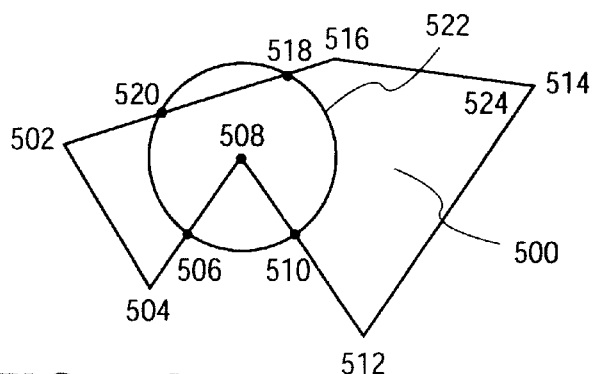
FIGS. 5(a), 5(b), 5(c), and 5(d) illustrate the sequence of rounding a sharp V corner at vertex 508.

Moreover, a generalized polygon refers to a polygon, which can have an arbitrary number of "holes". The holes can further contain other generalized polygons. Such polygons are referred to as "islands". In FIG. 6(a), the triangle contained within the symbol "A" is an example of a hole. If an additional rectangle resides in the hole, the rectangle is then an example of an island. Also, "polygon 402-404-406" as shown in FIG. 4 is used to describe a polygon with the numbered vertices. Similarly, line segments or edges are also described in terms of their end points. In particular, the following sections use "line segment 504-508" or "edge 504-508" to represent a line segment between vertex 504 and vertex 508. "∥Line segment 504-508 ∥" or "∥edge 504-508 ∥" denotes the length of line segment 504-508, or in other words, the distance between vertex 504 and 508. On the other hand, lines, unlike line segments, are not limited by two end points. Lastly, a "corner", unless having been specified otherwise, refers to a common end point of two line segments and is used interchangeably with 'vertex' throughout the following discussion. A "corner angle" is the angle between such two line segments. An example is illustrated in FIG. 5(a), where line segments 512–514 and 514–516 intersect at vertex 514 or corner 514. Corner angle 524 is the angle between the intersecting line segments.

Figure 1:
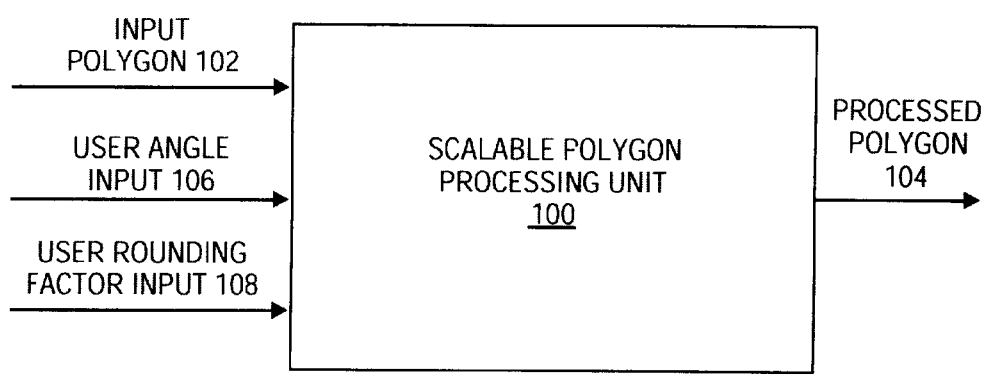
FIG. 1 illustrates the general block diagram of a scalable polygon processing unit.
Figure 2:
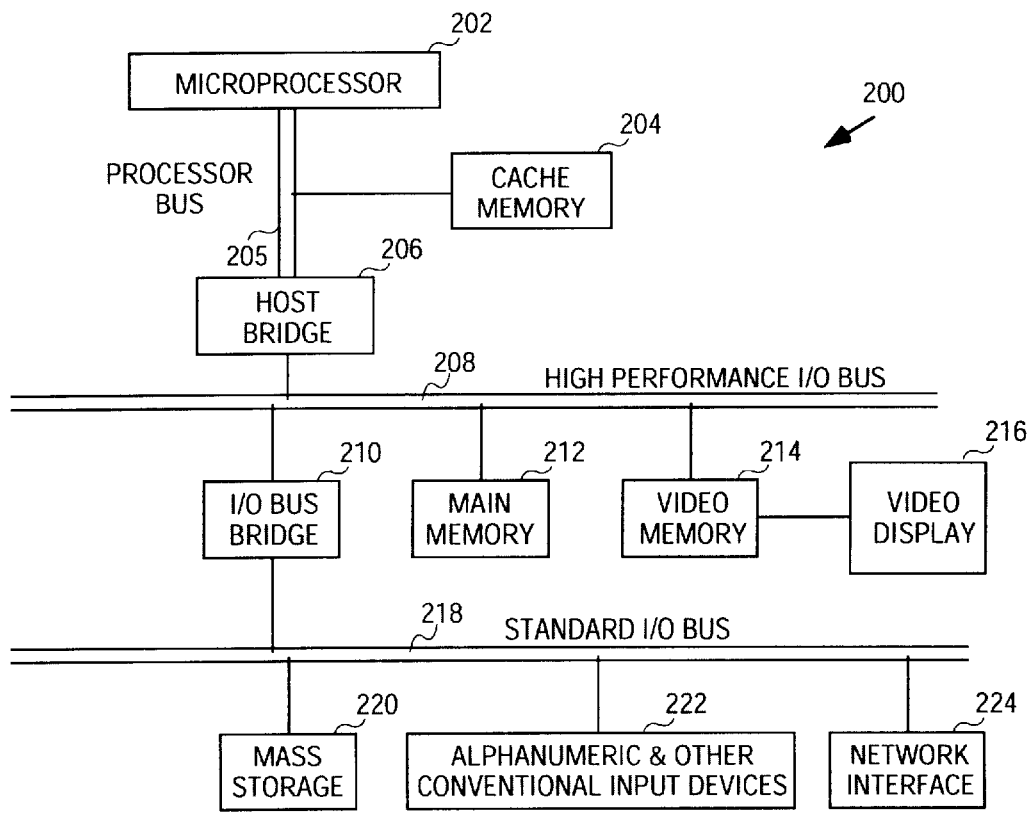
FIG. 2 illustrates a general-purpose computer system architecture.

FIG. 1 demonstrates a general block diagram of one embodiment of a scalable polygon processing unit. Scalable polygon processing unit 100 (hereinafter referred to as SPPU 100) can be programmed or implemented in an electronic system. Some examples of an electronic system are, but not limited to, add-in circuit boards, standalone electronic apparatuses and general-purpose computer systems. A general-purpose computer system 200 is illustrated in FIG. 2.

The general-purpose computer system architecture comprises microprocessor 202 and cache memory 204 coupled to each other through processor bus 205. Sample computer system 200 also includes high performance I/O bus 208 and standard I/O bus 218. Processor bus 205 and high performance I/O bus 208 are bridged by host bridge 206, whereas high performance I/O bus 208 standard I/O bus 218 are bridged by I/O bus bridge 210. Coupled to high performance I/O bus 208 are main memory 212 and video memory 214. Alternatively, main memory 212 can also be coupled to host bridge 206. Coupled to video memory 214 is video display 216. Additionally, a video processing device may also be coupled to host bridge 206. Coupled to standard I/O bus 218 are mass storage 220, network interface 224, and alphanumeric input device or other conventional input device 222.

These elements perform their conventional functions well known in the art. In particular, mass storage 220 may be used to provide permanent storage for the executable instructions in one embodiment, whereas main memory 212 may be used to temporarily store the executable instructions of an embodiment during execution by microprocessor 202.

Operation of the Present Invention

A method and apparatus for smoothing a generalized polygon is described. Specifically, in one embodiment, the method identifies vertices in a generalized polygon with sharp corners and replaces such sharp corners with rounding arcs.

Figure 3:
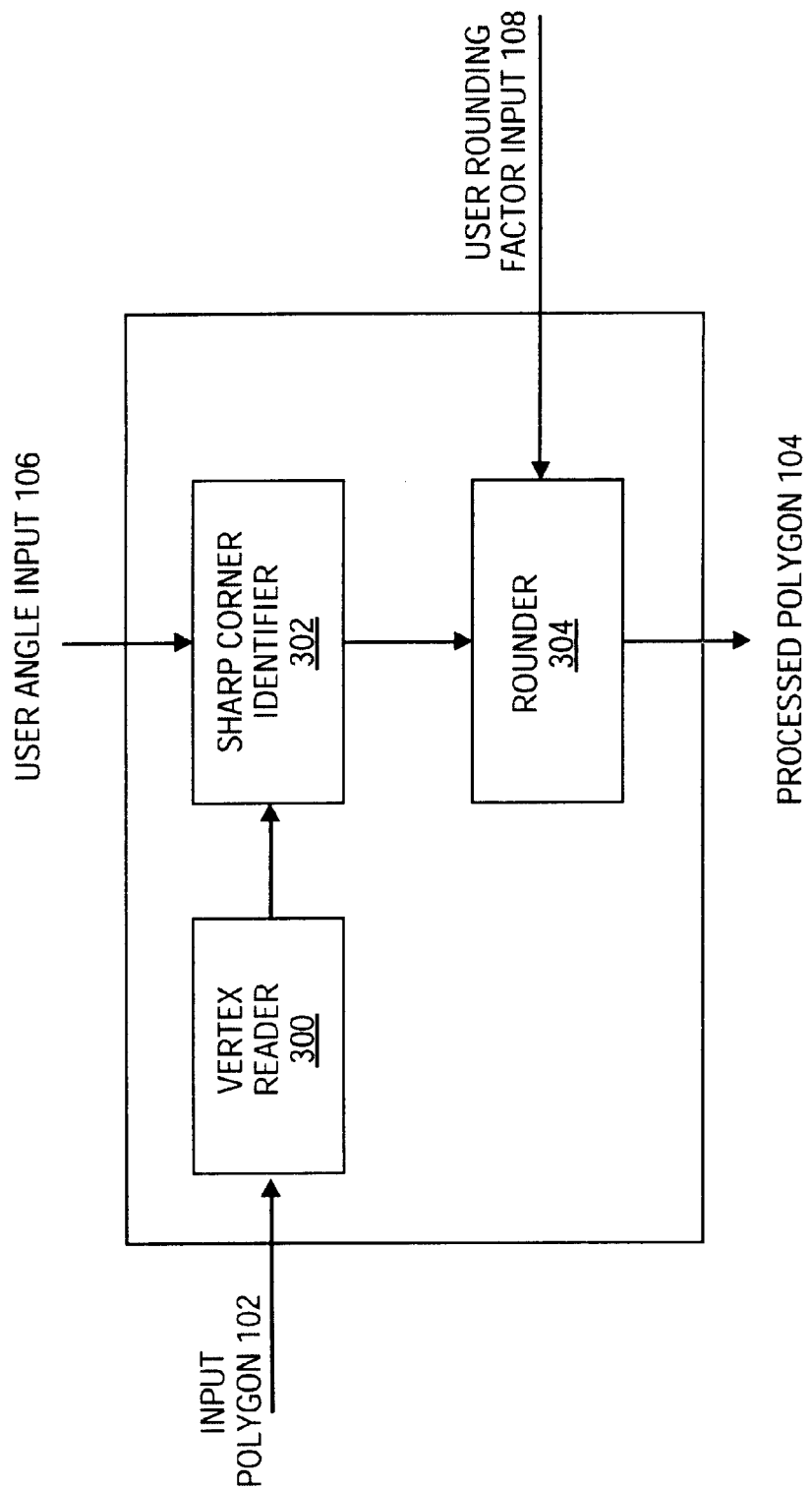
FIG. 3 illustrates the detailed block diagram of a scalable polygon processing unit.

The embodiment operates on an electronic system or in particular, general-purpose computer 200. FIG. 3 further describes various components of the embodiment, namely, vertex reader 300, sharp corner identifier 302, user angle input 106, rounder 304 and user rounding factor input 108. It should be noted that user angle input 106 and user rounding factor 108 in FIG. 3 are the same inputs shown in FIG. 1.

To begin with, vertex reader 300 receives input polygon 102 as its input. In one implementation, the input is input polygon 102's relevant coordinate information. Using triangle 400 shown in FIG. 4 as an example of input polygon 102, the input to vertex reader 300 is then the coordinate information of all three triangles' vertices, namely, vertices 402, 404 and 406. It should be noted that such coordinate data can be utilized to reconstruct a polygon, or in this case, triangle 400 by connecting all adjacent vertices by line segments.

In an alternative embodiment, instead of receiving coordinate information directly, vertex reader 300 may receive an image of input polygon 102. Consequently, vertex reader 300 may encompass functionality such as edge detection or other known image processing schemes to translate this input image into appropriate coordinate information. It is important to note that in addition to the two aforementioned approaches, other coordinate generation and manipulation schemes should have been apparent to one with ordinary skill in the art to utilize and yet still remain within the scope of the present invention.

After sharp corner identifier 302, or hereinafter referred to as SCI 302, receives input polygon 102's coordinate information, SCI 302 proceeds to analyze such information. Particularly, SCI 302 examines each vertex of input polygon 102 and determines whether a sharp corner, or a corner with a sharp corner angle, exists or not.

Again using triangle 400 in FIG. 4 as an illustration, line segments 402-406 and 404-406 formulate corner angle 408, at vertex 406. Line segments 404-406 and 402-404 formulate another, 412, at vertex 404. At last, line segments 406-402 and 402-404 generate corner angle 410 at vertex 402. In order to identify sharp corners, in one embodiment, SCI 302 first predefines a range of angle degrees, which are considered sharp. SCI 302 then calculates each of the mentioned corner angles, 408, 410 and 412. The embodiment employs the following equations to perform such calculations:

Equation 1:

$$\bullet = \cos^{-1}[(u \cdot v)/\|u\| \times \|v\|]$$  Equastion 1, where $\|u\|$' stands for length of u, '•' for corner angle and $\cos^{-1}$ represents the inverse of cosine. Using corner angle 410 in FIG. 4 as an illustration and assuming vertex 402 has x-y coordinates of (0, 0), vertex 406 has coordinates (a, b) and vertex 404 has coordinates (c, d):

| | |
|---|---|
| u · v | = vector 402–406 · vector 402–404 |
| | = a * c + b * d |
| $\|u\|$ | = $\|$vector 402–06$\|$ |
| | = $(a^2 + b^2)^{1/2}$ |
| $\|v\|$ | = $\|$vector 402–404$\|$ |
| | = $(c^2 + d^2)^{1/2}$ |
| Corner angle 410 | = $\cos^{-1}[(a * c + b * d)/((a^2 + b^2)(c^2 + d^2)^{1/2}]$ |

It should be emphasized that the discussed set of equations is for illustration purposes. It should have been obvious to one ordinarily skilled in the art to apply other methods of ascertaining corner angles without departing from the spirit of the present invention.

Finally, by comparing each of the calculated corner angles to this predefined range, SCI 302 determines whether any of the angles falls within the range. When a corner angle does, the corner corresponding to such an angle is considered a sharp corner. Although the predefined range of angle degrees may remain fixed, SCI 302 can implement a different mechanism as shown in FIG. 3, wherein this range of sharp angle degrees is modifiable by a user through user angle input 106. In other words, SCI 302 provides a user the flexibility to alter the range of degrees.

Figure 5B:
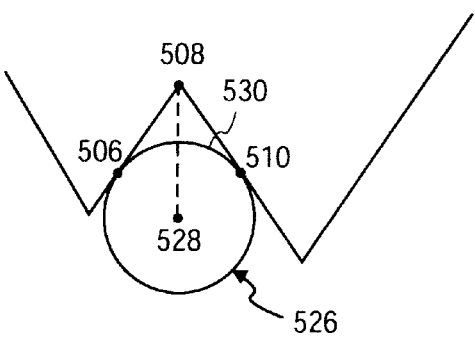
Figure 5C:
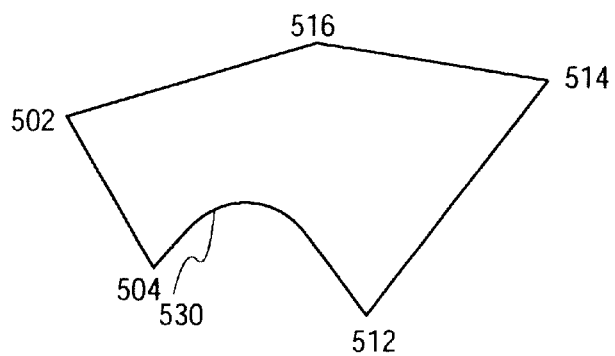

Subsequent to SCI 302's identification of sharp corners, rounder 304 proceeds to replace the sharp corners with rounding arcs. FIGS. 5(a), 5(b), and 5(c) illustrate a series of steps one embodiment of rounder 304 goes through. Specifically, FIG. 5(a) demonstrates polygon 502-504-508-512-514-516-502 with a sharp corner at vertex 508, which rounder 304 processes. Rounder 304 initially calculates the distance between the two closest adjacent Vertices corresponding to sharp corners, such as vertex 504 and vertex 508. Then rounder 304 sets the maximum allowable radius of circle 522 to half of the calculated distance, or mathematically, $$½ \times \| \text{ coordinates of } 504 - \text{coordinates of } 508 \|.$$

After having established an upper bound on the length of radius for circle 522, rounder 304 then selects the two intersections between polygon 500 and circle 522, which first connect to the center of circle 522, to operate on. In FIG. 5(a), the intersections are points 506 and 510. With these selected intersections, rounder 304 draws circle 526 shown in FIG. 5(b), which has center 528 and passes through both intersections 506 and 510. Moreover, circle 526 is also tangent to line segment 506-508 at point 506 and to line segment 508-510 at point 510.

In order to choose a proper rounding arc from circle 526, rounder 304 draws a line from center 528 to vertex 508. The appropriate arc not only has end points 506 and 510, but it also intersects with line segment 528-508. As FIG. 5(b) illustrates, rounding arc 530 satisfies both of the requirements and is thus the proper rounding arc.

Figure 5D:
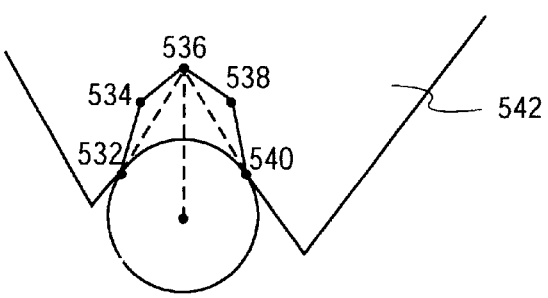

With rounding arc 530, rounder 304 completes its rounding process and demonstrates the result in FIG. 5(c). Specifically, rounder 304 replaces the relevant points of the sharp corner at vertex 508 with rounding arc 530. The relevant points being replaces are the points between 506 and 510 on polygon 500. This same replacement procedure applies to all of polygon 500's sharp corners, and the final outcome is processed polygon 104. Although line segments 506-508 and 508-510 coincide with the points between intersection points 506 and 510 on polygon 500 as shown in FIG. 5(b), this described rounding process also applies to polygon 542 as shown in FIG. 5(d). Specifically, line segments 532-536 and 536-540 do not coincide with points on polygon 542. The rounding process nevertheless attempts to replace all the relevant points between intersection points 532 and 540 on polygon 542 with an appropriate rounding arc. Some examples of these relevant points are points 534 and 538.

Additionally, a user can adjust the amount of "rounding" by supplying user rounding factor input 108 in one embodiment of the present invention. More particularly, rounder 304 multiplies the inputted factor to the previously described maximum allowable radius and generates the length of radius for circles such as circle 522. The shorter the generated radius is, the smaller the resulting rounding arc, such as rounding arc 530 is, and as a result, the more negligible the rounding effects are. FIGS. 6(a), 6(b), and 6(c) illustrate this relationship between user rounding factor input 108 and a processed polygon. FIG. 6(a) shows an unprocessed input polygon. After having gone through the previously discussed rounding process, FIG. 6(b) demonstrates a processed polygon with a rounding factor of 0.5 and FIG. 6(c) with a rounding factor of 1.

Although the preceding discussion describes specific modules of one embodiment of SPPU 100, such as vertex reader 300, sharp corner identifier 302 and rounder 304, it should have been obvious to one ordinarily skilled in the art to design or implement the disclosed functions differently and still do not exceed the scope of the present invention. For instance, functionality of vertex reader 300 and sharp corner identifier 302 may merge into one module. On the other hand, functionality of rounder 304 may further split up and distribute to additional other modules.

Figure 7A:
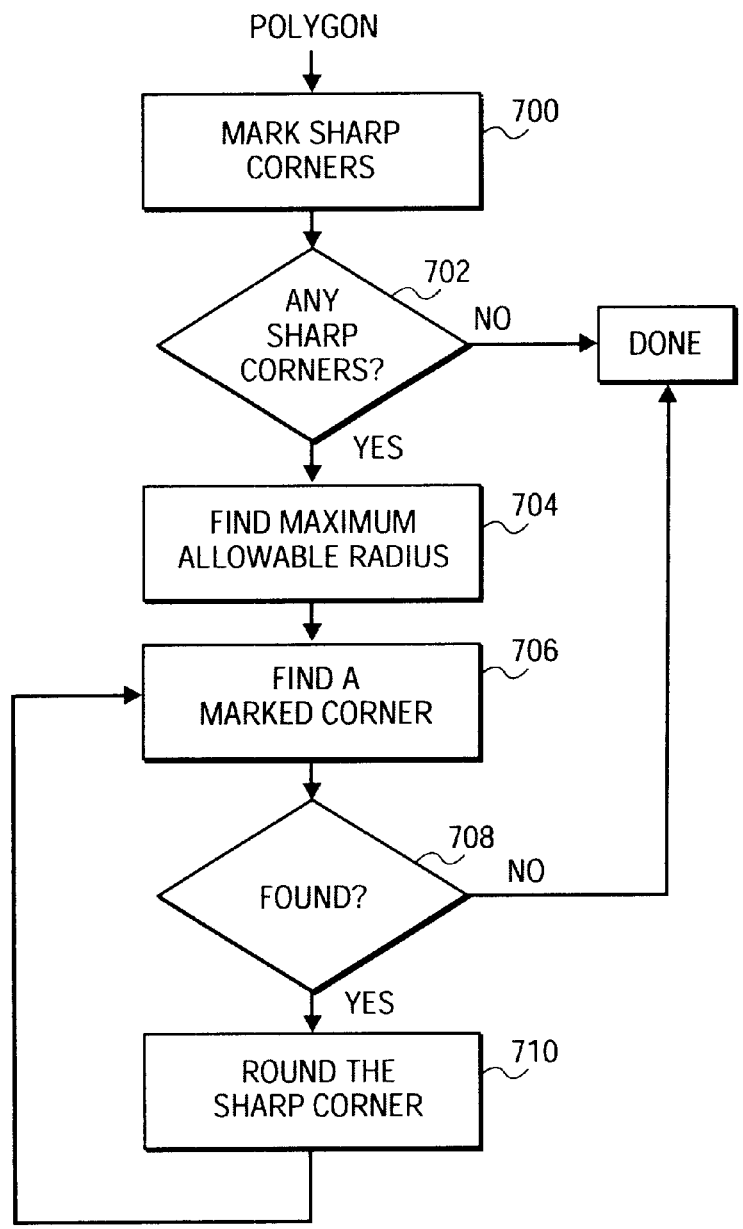
FIGS. 7(a) and 7(b) illustrate the flow chart of one embodiment of a scalable polygon processing unit.
Figure 7B:
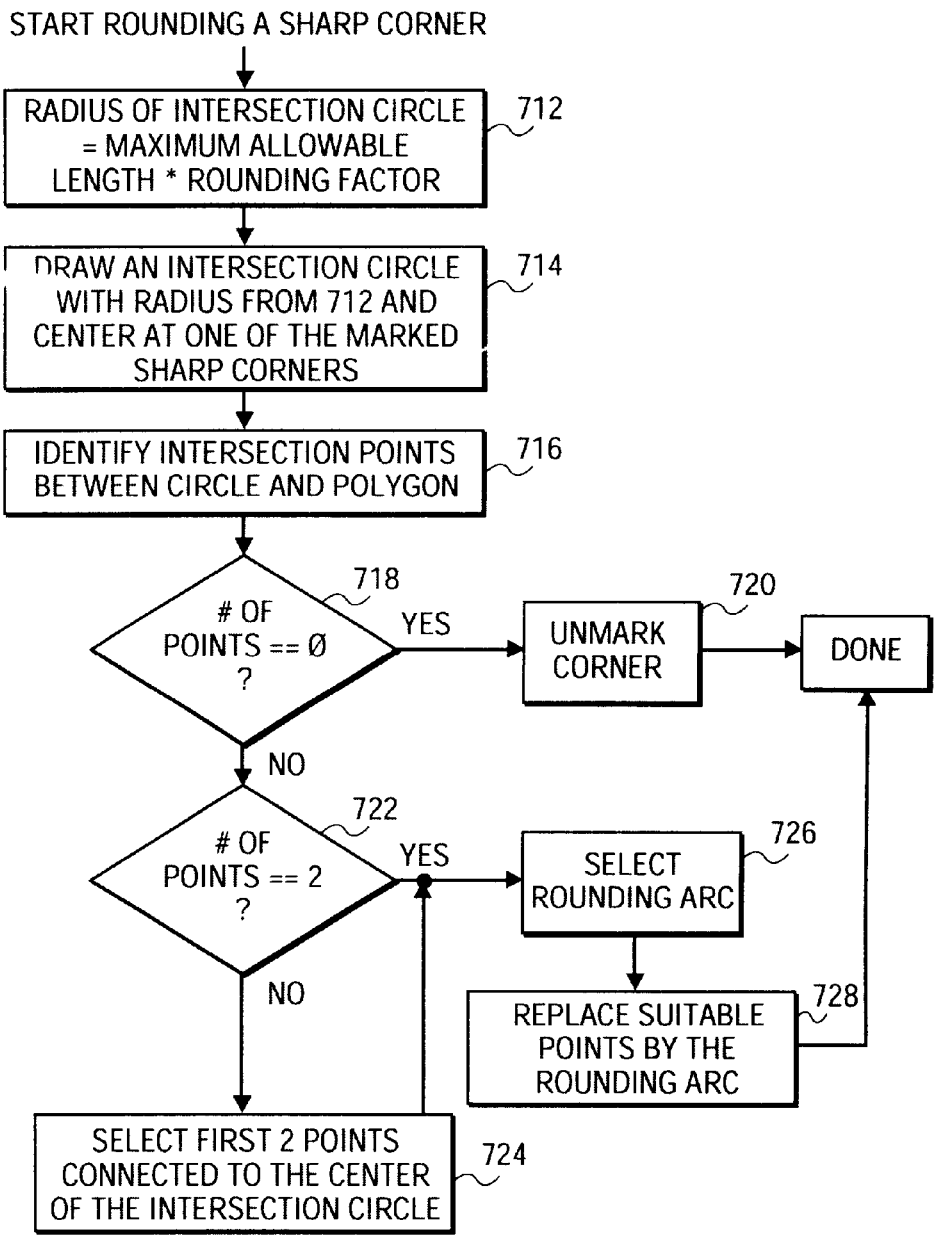

In addition to describe the operations of the present invention in terms of functional modules, the operations can also be summarized in a flow charts shown in FIG. 7(a) and 7(b). In conjunction with the embodiment shown in FIG. 1, FIG. 7(a) and FIG. 7(b) demonstrate various steps SPPU 100 executes to smooth a generalized polygon, such as input polygon 102. SPPU 100 begins by identifying and marking corners of input polygon 102 in step 700. Then SPPU 100 determines the number of these identified corners' angles falling within predefined range of sharp angle degrees in step 702. When a corner angle is within the predefined range, the corner is considered a sharp angle. SPPU 100 continues with its subsequent operations if at least one sharp corner exists.

After all the sharp corners and their corresponding vertices have been located and marked, SPPU 100 proceeds to calculate the maximum allowable radius for an intersection circle in step 704. Using FIG. 5(a) as an illustration, the intersection circle is circle 522. One method of establishing the maximum allowable radius of circle 522 is based on the distance between vertices 504 and 508.

After having defined the radius to be less than or equal to the calculated maximum allowable length, SPPU 100 attempts to process each one of the already identified vertices with sharp corners in steps 706, 708 and 710. As has been previously mentioned, SPPU 100 is also capable of receiving user inputs and adjusting the radius of the intersection circle accordingly.

Step 710 is further expanded in FIG. 7(b), where the radius of the intersection circle is modified by a rounding factor in step 712. The intersection circle may cross the generalized polygon, or input polygon 102 at a number of different locations. Therefore, after SPPU 100 formulates the intersection circle using the established radius length in step 712 and the established center in step 714, SPPU 100 proceeds to identify the intersection points in step 716. As an example, points 506, 510, 518 and 520 shown in FIG. 5(a) are intersection points.

Figure 8A:
FIGS. 8(a), 8(b), and 8(c) illustrate examples of representing a round arc with discrete line segments.
Figure 8B:
Figure 8C:

Steps 718, 720, 722, 724, 726, and 728 demonstrate one algorithm of identifying the appropriate two intersection points, which also connect to the center of the intersection circle, as the end points of a rounding arc. In particular, as has been demonstrated in FIG. 5(a), although four intersection points, namely, 506, 510, 518 and 520, exist, only two of them connect to the center, 508. They are points 506 and 510. SPPU 100 uses these intersection points as the end points of a rounding arc in step 728. FIGS. 5(b) and 5(c) further illustrate the process of the relevant points between end points 506 and 510 with the corresponding rounding Also, SPPU 100 represents the discussed rounding arc with a set of discrete line segments. Examples of this representation are shown in FIGS. 8(b) and 8(c). As the number of line segments increases, the resulting arc approaches to the expected rounding arc 800 of FIG. 28(a). It should be noted that rounding arc 802 of FIG. 8(b) has three line segments, and rounding arc 804 of FIG. 8(c) has six. Thus, rounding arc 804 achieves a more accurate approximation of rounding arc 800 than rounding arc 802.

It should be further noted that the number of line segments does not have to be a fixed number and can vary according to processor speed. In other words, when SPPU 100 detects a certain processor speed, SPPU 100 can then apply the suitable number of line segments to approximate the expected arcs. Alternatively, instead of altering the number according to processor speed, a user may manually control the number of line segments. As a result, SPPU 100 can set the number based on user preferences.

Although the flow charts illustrated in FIGS. 7(a) and 7(b) contain a certain sequence of steps in describing various phases of SPPU 100, it should have been apparent to one ordinarily skilled in the art to delete, add or reorder the steps without exceeding the scope of the invention. Additionally, even though one particular algorithm for selecting appropriate intersection points between the intersection circle and the input polygon has been described, it should have also been obvious to one with ordinary skill in the art to adopt other algorithms and still remain within the scope of the present invention.

Thus, a method and apparatus for smoothing a generalized polygon has been disclosed. Although the present invention has been described particularly with reference to the figures, the present invention may appear in any number of systems, which provide the capability of smoothing a generalized polygon. It is further contemplated that many changes and modifications may be made by one of ordinary skill in the art without departing from the spirit and scope of the present invention.

What is claimed is:

1. A machine-implemented method to smooth a polygon comprising:

identifying whether a polygon for an image has an angle that is a sharp corner;

defining a perimeter to surround the sharp corner by using a vertex forming the sharp corner as a reference point to define the perimeter and using a selected factor for distance from the vertex to the perimeter;

identifying a first point and a second point of the polygon based on where the perimeter and the polygon intersect;

defining a second reference point based on the first and second points;

defining an arc between the first and second points; and replacing the sharp corner with the arc.

2. The method of claim 1, wherein the identifying the angle includes identifying whether the angle is in a range of angles.

3. The method of claim 2, wherein the identifying the angle in the range of angles comprises identifying the angle of the sharp corner based on coordinates of vertices of the polygon.

4. The method of claim 2, further comprising enabling a user to define the range of angles.

5. The method of claim 1, wherein the perimeter is the circumference of a circle.

6. The method of claim 1, comprising enabling a user to define the factor with which the perimeter is defined.

7. The method of claim 1, wherein the defining the arc comprises defining the arc such that the arc is tangent to a line between the first point and the vertex of the sharp corner and tangent to a line between the second point and the vertex of the sharp corner.

8. The method of claim 1, wherein defining the arc includes representing the arc with line segments.

9. The method of claim 1, further comprising performing the replacing for multiple sharp corners of the polygon.

10. The method of claim 1, further comprising displaying the image after the sharp corner of the polygon has been replaced with the arc.

11. The method of claim 5, wherein the defining the perimeter includes defining the radius of the circle based on a distance between two adjacent sharp corners of the polygon.

12. A machine readable medium having embodied thereon instructions that, if executed by a machine, cause the machine to perform a method to smooth a polygon comprising:

identifying whether a polygon for an image has an angle that is a sharp corner;

defining a perimeter to surround the sharp corner by using a vertex forming the sharp corner as a reference point to define the perimeter and using a selected factor for distance from the vertex to the perimeter;

identifying a first point and a second point of the polygon based on where the perimeter and the polygon intersect;

defining a second reference point based on the first and second points;

defining an arc between the first and second points; and replacing the sharp corner with the arc.

13. The machine readable medium of claim 12, wherein identifying the angle includes identifying whether the angle is in a range of angles.

14. The machine readable medium of claim 13, wherein identifying the angle in the range of angles comprises identifying the angle of the sharp corner based on coordinates of vertices of the polygon.

15. The machine readable medium of claim 13, wherein the method further comprises enabling a user to define the range of angles.

16. The machine readable medium of claim 12, wherein the perimeter is the circumference of a circle.

17. The machine readable medium of claim 12, wherein the method further comprises enabling a user to define the factor with which the perimeter is defined.

18. The machine readable medium of claim 12, wherein the defining the arc comprises defining the arc such that the arc is tangent to a line between the first point and the vertex of the sharp corner and tangent to a line between the second point and the vertex of the sharp corner.

19. The machine readable medium of claim 12, wherein defining the arc includes representing the arc with line segments.

20. The machine readable medium of claim 12, wherein the method further comprises performing the replacing for multiple sharp corners of the polygon.

21. The machine readable medium of claim 12, wherein the method further comprises displaying the image after the sharp corner of the polygon has been replaced with the arc.

22. The machine readable medium of claim 16, wherein defining the perimeter includes defining the radius of the circle based on a distance between two adjacent sharp corners of the polygon.

23. An apparatus comprising:

a polygon processing unit to smooth a polygon, wherein the polygon processing unit includes:

a sharp corner identifier to identify whether a polygon for an image has an angle that is a sharp corner; and a rounder, coupled to the sharp corner identifier, to define a perimeter to surround the sharp corner by using a vertex forming the sharp corner as a reference point to define the perimeter and using a selected factor for distance from the vertex to the perimeter; to identify a first point and a second point of the polygon based on where the perimeter and the polygon intersect; to define a second reference point based on the first and second points; to define an arc between the first and second points; and to replace the sharp corner with the arc.

24. The apparatus of claim 23, wherein the sharp corner identifier to identify whether the angle is in a range of angles.

25. The apparatus of claim 24, further comprising a vertex reader, coupled to the sharp corner identifier, to identify coordinates of vertices of the polygon, wherein the sharp corner identifier to identify the angle of the sharp corner based on the coordinates.

26. The apparatus of claim 24, wherein the sharp corner identifier to receive the range of angles as defined by a user.

27. The apparatus of claim 23, wherein the perimeter is the circumference of a circle.

28. The apparatus of claim 23, wherein the rounder to receive a user-defined factor for the selected factor with which the perimeter is defined.

29. The apparatus of claim 23, wherein the rounder to define the arc such that the arc is tangent to a line between the first point and the reference point at the sharp corner and tangent to a line between the second point and the reference point at the sharp corner.

30. The apparatus of claim 23, wherein the rounder to represent the arc with line segments.

31. The apparatus of claim 23, wherein the sharp corner identifier to identify multiple sharp corners of the polygon, and the rounder to replace the identified sharp corners of the polygon with arcs.

32. The apparatus of claim 23, further comprising a display to display the image after the sharp corner of the polygon has been smoothed.

33. The apparatus of claim 27, wherein the e circle based on a distance between two adjacent sharp corners of the polygon.

34. A system comprising:

a processor; and a medium to operate with the processor to store instructions that, if executed by the processor, cause the processor to smooth a polygon, wherein the instructions that cause the processor to smooth a polygon include instructions to identify whether a polygon for an image has an angle that is a sharp corner, to define a perimeter to surround the sharp corner by using a vertex forming the sharp corner as a reference point to define the perimeter and using a selected factor for distance from the vortex to the perimeter to identify a first point and a second point of the polygon based on where the perimeter and the polygon intersect to define a second reference point based on the first and second points to define an arc between the first and second points and to replace the sharp corner with the arc.

35. The system of claim 34, wherein the instructions further include instructions to determine whether a corner of the polygon has the angle in a range of angles.

36. The system of claim 35, wherein the instructions further include instructions to determine the angle of the corner based on coordinates of vertices of the polygon.

37. The system of claim 35, wherein instructions cause the processor to enable a user to define the range of angles.

38. The system of claim 34, wherein the perimeter is defined to be a circumference of a circle.

39. The system of claim 34, wherein the instructions cause the processor to enable a user to define the factor with which the perimeter is defined.

40. The system of claim 34, the instructions cause the processor to define the arc such that the arc is tangent to a line between the first point and the reference point at the sharp corner and tangent to a line between the second point and the reference point at the sharp corner and tangent to a line between the second point and the reference point at the sharp corner.

41. The system of claim 34, wherein the instructions cause the processor to represent the arc with line segments.

42. The system of claim 34, wherein the instructions cause the processor to identify multiple sharp corners of the polygon and to replace the identified multiple sharp corners of the polygon with arcs.

43. The system of claim 34, further comprising instructions that cause the processor to display an image of the polygon after the sharp corner of the polygon has been smoothed.

44. The system of claim 38, wherein the instructions cause the processor to define a radius of the circle based on a distance between two adjacent sharp corners of the polygon.

45. A machine-implemented method to smooth a polygon comprising:

identifying whether a polygon for an image has an angle that is a sharp corner;

defining a circular perimeter to surround the sharp corner by using a vertex forming the sharp corner as a reference point to define a circular perimeter and using a selected factor for a radius of the circular perimeter from the vertex to the perimeter;

identifying a first point and a second point of the polygon based on where the circular perimeter and the polygon intersect the first and second points being the nearest intersect points to the vertex;

defining a second reference point based on the first and second points;

defining an arc between the first and second points; and replacing the sharp corner with the arc.

46. The method of claim 45, further comprising enabling a user to define the radius with which the circular perimeter is defined.

47. The method of claim 45, wherein defining the arc defines the arc to be tangent to a line between the first point and the reference point at the sharp corner and tangent to a line between the second point and the reference point at the sharp corner.

48. The method of claim 45, wherein defining the arc comprises representing the are with line segments.

49. The method of claim 45, further comprising displaying the image of the polygon with the sharp corner smoothed.

50. The method of claim 1, wherein the defining the perimeter includes defining the radius of a circle based on a distance between two adjacent corners of the polygon.

51. A machine readable medium having embodied thereon instructions that, if executed by a machine, cause the machine to perform a method to smooth a polygon comprising:

identifying whether a polygon for an image has an angle that is a sharp corner;

defining a circular perimeter to surround the sharp corner by using a vertex forming the sharp corner as a reference point to define a circular perimeter and using a selected factor for a radius of the circular perimeter from the vertex to the perimeter;

identifying a first point and a second point of the polygon based on where the circular perimeter and the polygon intersect the first and second points being, the nearest intersect points to the vertex;

defining second reference point based on the first and second points;

defining an arc between the first and second points; and replacing the sharp corner with the arc.

52. The machine readable medium of claim 51, wherein the instructions enable a user to define the radius with which the perimeter is defined.

53. The machine readable medium of claim 51, wherein defining the arc defines the arc to be tangent to a line between the first point and the reference point at the sharp corner and tangent to a line between the second point and the reference point at the sharp corner.

54. The machine readable medium of claim 51, wherein defining the arc comprises representing the arc with line segments.

55. The machine readable medium of claim 51, further displaying the image of the polygon with the sharp corner smoothed.

56. The machine readable medium of claim 1, wherein defining the radius of the circle based on a distance between two adjacent corners of the polygon.

\* \* \* \* \*

UNITED STATES PATENT AND TRADEMARK OFFICE
CERTIFICATE OF CORRECTION

PATENT NO. : 6,697,080 B2
DATED : February 24, 2004
INVENTOR(S) : Trika et al.

It is certified that error appears in the above-identified patent and that said Letters Patent is hereby corrected as shown below:

<u>Title page,</u>
Item [57], ABSTRACT,
Line 9, before "formulates", delete "ten", insert -- then --.

Signed and Sealed this

Fourth Day of May, 2004

JON W. DUDAS
*Acting Director of the United States Patent and Trademark Office*